July 5, 1932. W. TODD 1,866,512
BALL AND SOCKET JOINT
Filed Oct. 15, 1931 2 Sheets-Sheet 1

Inventor,
William Todd.
By William A. Miller
Attorney

July 5, 1932.  W. TODD  1,866,512
BALL AND SOCKET JOINT
Filed Oct. 15, 1931   2 Sheets-Sheet 2
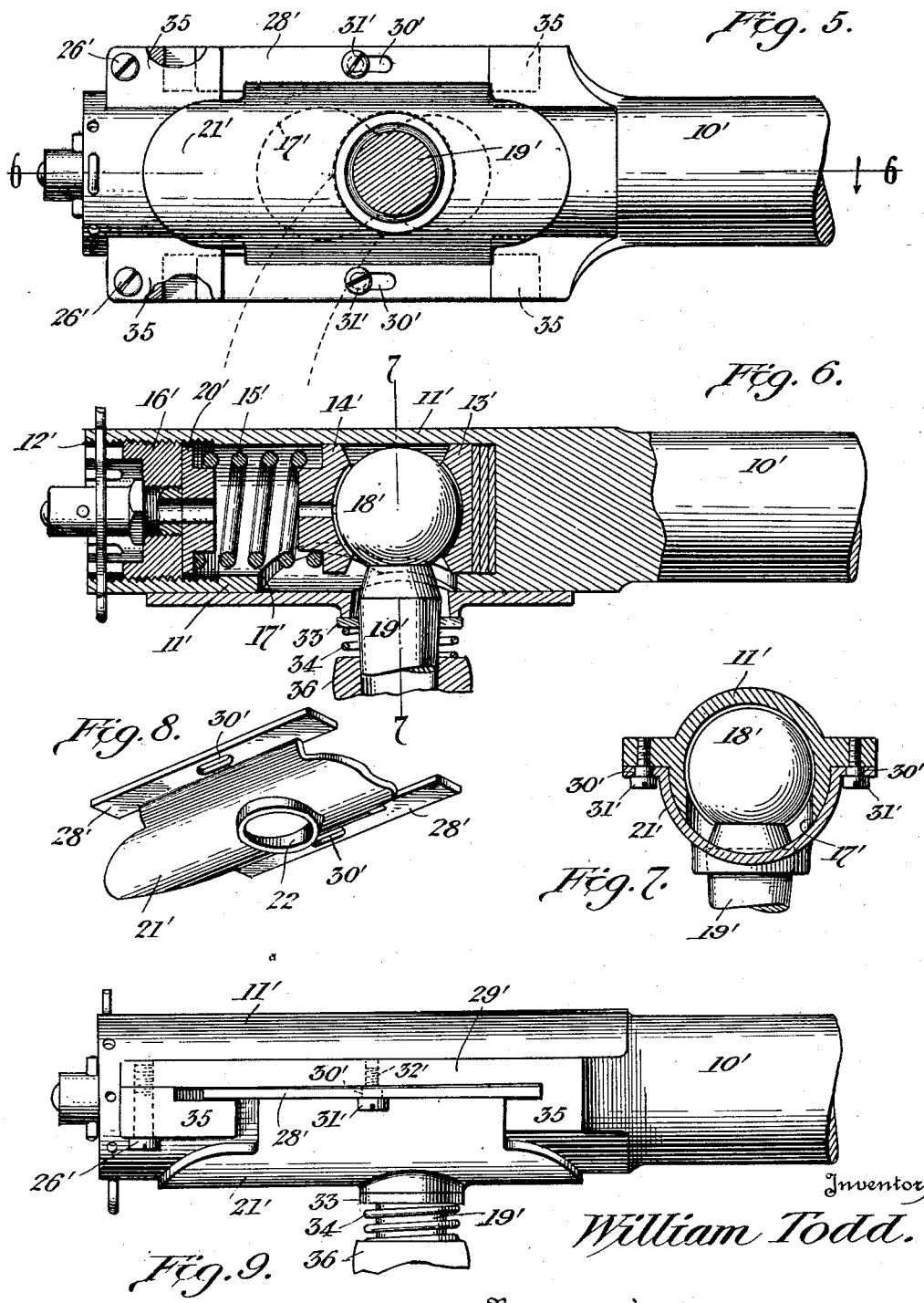

Patented July 5, 1932

1,866,512

UNITED STATES PATENT OFFICE

WILLIAM TODD, OF LEOMINSTER, MASSACHUSETTS

BALL AND SOCKET JOINT

Application filed October 15, 1931. Serial No. 569,083.

The present invention relates to ball and socket connections and particularly to that type of ball and socket connection used in connection with the drag link and connecting rods of automobile steering devices.

The connections between the drag links and the tie rods of automobile steering gears now generally in use, comprise a tubular socket having a slot in one side thereof, said slot having an enlarged end or portion in which is inserted the enlarged or ball end of a connecting stud or rod. Yieldable means are provided in the socket for moving and holding the ball end opposite the reduced end of the slot so that said ball or headed end of the stud normally cannot be withdrawn through the slot. However, due to crystallization of the yieldable means, or to breakage and wear of the parts, or to severe jolts or shocks, it often occurs that the headed end of the stud is able to slip through the enlarged end of the socket and disconnect the joint, resulting in great damage to property, injury, or loss of life.

The object of the present invention is the provision of means which permit the free swiveling or pivoting movement of the ball joint or connection, but which will prevent the joint from becoming disconnected should the bearing parts of the joint become worn or broken, thus definitely insuring positive connection between the parts at all times.

With the above and other objects in view, the invention resides in the sundry details of construction, combination and arrangement of parts hereinafter more fully described and pointed out in the appended claims.

In the drawings which show the preferred embodiment of the invention as at present devised:

Figure 5 is an elevation of the modified form of the invention;

Figure 6 is a longitudinal sectional view taken substantially on line 6—6 of Figure 5;

Figure 7 is a transverse sectional view taken substantially on line 7—7 of Figure 6;

Figure 8 is a perspective view of the slidable retaining plate; and

Figure 9 is an elevation of the invention in the positions shown in Figure 6.

Figure 1:
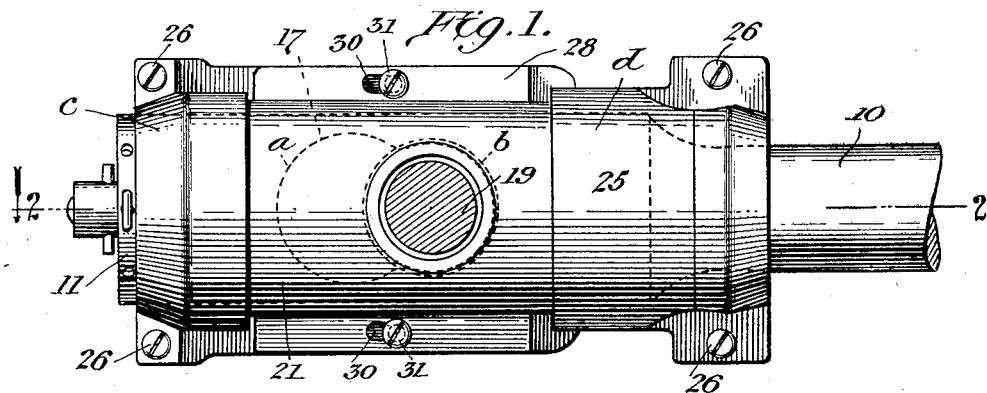
Figure 1 is an elevation of one form of the invention.
Figure 2:
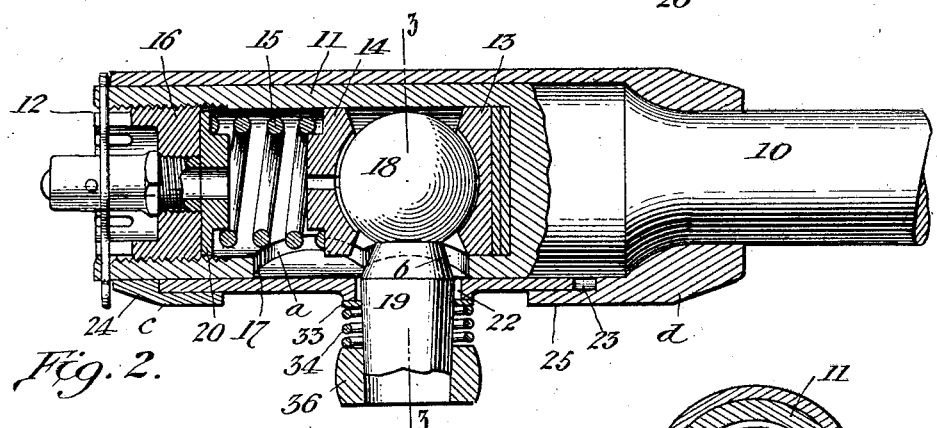
Figure 2 is a longitudinal sectional view taken substantially on line 2—2 of Figure 1.
Figure 3:
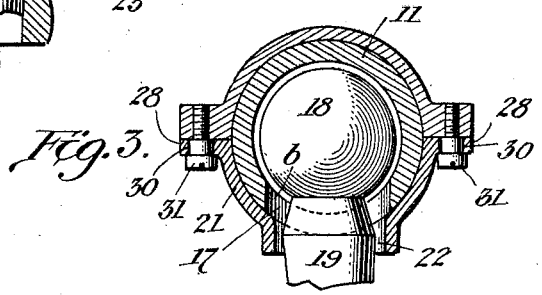
Figure 3 is a transverse section taken substantially on line 3—3 of Figure 2.
Figure 4:
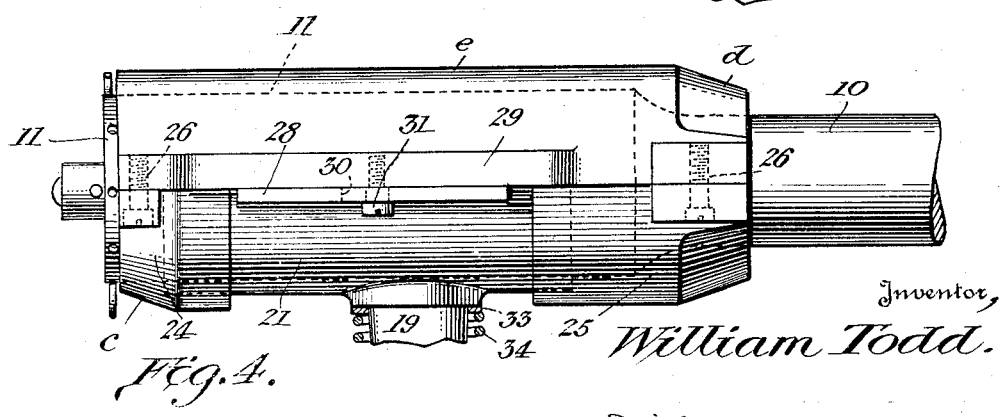
Figure 4 is an elevation of the device in the position shown in Figure 2.

The invention, as shown in Figures 1 to 4 inclusive, illustrates an attachment for drag-link or tie-rod ball and socket joints of the type now generally in use, which consists of a rod or link 10 having a tubular end portion 11 open at its outer end 12 through which the bearing plates 13 and 14 are inserted together with the compression spring 15 and the cap nut 16.

The tubular end 11, which provides what is commonly termed the "socket", is provided in its side wall with an elongated slot 17 generally extending longitudinally of the socket, one end of the slot 17, preferably the outer end, is enlarged as at $a$ so as to permit the headed or ball end 18 of the stud or rod projection 19 to pass therethrough into the socket. In assembling the parts, the bearing plate 13 is first positioned against the inner end wall of the socket, the ball 18 is then inserted through the enlarged end $a$ of the slot 17, the bearing plate 14 is then inserted through the end 12 of the socket, then the spring 15, spacing washers 20 and finally the cap nut 16 is threaded in the opening 12. With the parts in position, the spring 15 presses the bearing plate 17 against the ball head until it is in contact with the bearing plate 13. The nut 12 is tightened sufficiently to exert the necessary pressure to hold the parts in place yet permitting the ball to swivel or pivot between the plates. Substantially all of the structure described is found in most drag link and connecting rod joints.

The present invention consists of a slidable plate 21 to be positioned before the slot 17 and shaped to conform to and have a relative sliding movement on the outer surface of the tubular member 11 of the rod. This plate 21 has an opening 22 therein through which the rod or stud 19 may extend but of smaller dimension than the diameter of the ball 18 of the stud. The plate 21 may be attached to the socket end of the rod 10 in any suitable manner which will permit its normal sliding movement longitudinally of the socket, but which will retain it in place so that, if any reason the spring 16 should break or become weakened or the bearing plates 13 and 14 released from engagement of the ball 18, said ball will not be withdrawn and disconnected from the socket but will be retained in position therein and connected with the link or rod 10 by the plate 10.

In Figures 1 to 4, the plate 21 has its end portions slidably mounted in spaced guideways 23 provided by band-like members 24 and 25 fastened or clamped about the outer and inner end portions respectively of the tubular member 11, these band members each having a portion thereof overlying the ends of the plate 21 and spaced from the body of the tubular member 11 so as to slidably receive and retain the ends of the plate 21. These band members may be made up of complemental sections and clamped together by suitable fastening means such as screws 26, or they may consist of a semi-cylindrical plate *e* which is substantially the length of the tubular member 11 of the rod 10 to which the complemental semi-circular band members *c* and *d* are, respectively, secured at its ends and positioned to overlie the end portions of the plate 21 as clearly shown in Figures 1, 2 and 3. If further rigidity is desired, the opposing longitudinal edges of the plates 21 and of the member *e* may be formed with flanges 28 and 29 respectively, the flanges 28 each having an elongated slot 30 therein through which a screw 31 extends into a threaded opening 32 in the flange 29. In some forms of the invention it may be desired to dispense with the end members *c* and *d* and to employ only the member *e* secured to the plate 21 through the screws 31 in the manner just described.

The opening 22 in the plate 21 may be further closed if desired by a soft washer 33 which surrounds the stud 19 and bears against the outstanding flange at the edge of the opening 22. This washer may be held in position by spring 34 and bushing 36 or other suitable means surrounding the stud 19.

In Figures 5 to 9 inclusive a modified form of the invention is shown, wherein parts similar and identical to those shown and described in the preceding embodiment will bear the same reference characters raised by the exponent prime ('). The difference between this modified embodiment of the invention and the preceding embodiment is that tubular socket member 11' has integrally formed on opposite outer side wall portions, longitudinal ribs or flanges 29' on which are slidably mounted the longitudinal edge flanges 28' of the slidably retaining plate 21'. The end portions of the flanges 29' are provided with spaced and overlying eaves 35 under which are slidably retained the end portions of the flanges 28' of the plate 21'. Thus it will be seen that the plate 21' is slidably retained in position on the tubular member 11'.

At least one of the eave portions 35 of each flange 29' (as shown in the drawings at the outer ends of said flanges) is a separate piece held in position by the screws 26' whereby the plate 21' may be removed and replaced as occasion requires. The flanges 28' may also be provided with elongated slots 30' through which screws 31' pass and are secured in the threaded openings 32' of the flange 29'.

From the above it will be seen that a very simple and economical structure has been provided which will insure at all times the positive engagement between the connecting parts of the ball and socket joint irrespective of the condition of the compression spring, or of the bearing plates of the socket joint.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

Having thus described the invention, what is claimed is:

1. In a safety ball and socket joint including a tubular socket having an opened side face and longitudinal bearing faces on opposite sides of said opening, a ball inserted in the socket through said opening therein and having a shank extending through the opening, a slidably mounted plate closing the opening in the socket and having an opening therein of a size to permit said shank to pass therethrough but to prevent said ball from passing therethrough, said plate having portions bearing against the bearing surfaces of said socket and having longitudinally extending slots therein and means extending through said slots and detachably maintaining said plate in its slidably mounted position on the socket.

2. In a safety ball and socket joint including a tubular socket having an opened side face, a ball inserted in the socket through said opening therein and having a shank extending through the opening, a slidably mounted plate closing the opening in the socket and having an opening therein of a size to permit said shank to pass therethrough but to prevent said ball from passing therethrough, and means fast on the socket forming guide slots at the opposite ends of the plate in which end portions of said plate are slidably retained in all slidable positions thereof, whereby the plate is held against detachment.

3. In a safety ball and socket joint including a tubular socket having an opened side face and longitudinal bearing faces on opposite sides of said opening, a ball inserted in the socket through said opening therein and having a shank extending through the opening, a slidably mounted plate closing the opening in the socket, and having an opening therein of a size to permit said shank to pass therethrough but to prevent said ball from passing therethrough, said plate having portions bearing against the bearing surfaces of said socket and having longitudinally extending slots therein and retaining members on the socket at opposite ends of said plate and having the end portions of said plate slidably extending therein respectively, and said retaining members being detachable from the socket at, at least, one end of said plate.

4. In a safety ball and socket joint, including a tubular socket having an opening in one side face and longitudinal flanges on opposite sides of the opening in said face, projections fast on said socket and overlying and spaced from the end portions of said flanges to form retaining guide slots therebetween, a ball in said socket and having a shank extending through the open face thereof, a slidably mounted plate closing the opening in said socket and having an opening therein through which said shank extends and further having its side edges bearing on said longitudinal flanges with its end portions slidably extending into said guide-slots, and fastening means extending through longitudinal slots in said plate and into said flanges, said plate opening being of a size to prevent said ball from passing therethrough, and said guide slots being of a length to retain said plates therein in all slidable positions thereof.

5. In a safety ball and socket joint, including a tubular socket having an opening in one side face and bearing surfaces on opposite sides of the opening in said face, projections fast on said socket and overlying and spaced from the end portions of said bearing surfaces to form retaining guide slots therebetween, a ball in said socket and having a shank extending through the open face thereof, a slidably mounted plate closing the opening in said socket and having an opening therein through which said shank extends, and having end flanged portions slidably extending into said guideways, and fastening means detachably securing the said projections to the socket at, at least, one end of the plate, said plate opening being of a size to prevent said ball from passing therethrough, and said guide slots being of a length to retain said plates therein in all slidable positions thereof.

In testimony whereof, I hereunto set my hand.

WILLIAM TODD.